(12) United States Patent
Michaelis

(10) Patent No.: US 11,240,377 B2
(45) Date of Patent: Feb. 1, 2022

(54) INTERACTIVE SYSTEM FOR REROUTING A TWO-WAY TEXT COMMUNICATION PATHWAY

(71) Applicant: Avaya Inc., Santa Clara, CA (US)

(72) Inventor: Paul Roller Michaelis, Louisville, CO (US)

(73) Assignee: Avaya Inc., Santa Clara, CA (US)

( * ) Notice: Subject to any disclaimer, the term of this patent is extended or adjusted under 35 U.S.C. 154(b) by 85 days.

(21) Appl. No.: 16/378,789

(22) Filed: Apr. 9, 2019

(65) Prior Publication Data
US 2020/0329141 A1    Oct. 15, 2020

(51) Int. Cl.
H04M 3/493    (2006.01)
H04L 12/58    (2006.01)
H04W 4/14    (2009.01)

(52) U.S. Cl.
CPC ........ H04M 3/4931 (2013.01); H04L 51/046 (2013.01); H04L 51/14 (2013.01); H04M 3/4938 (2013.01); H04W 4/14 (2013.01)

(58) Field of Classification Search
CPC ....... H04L 51/36; H04L 51/28; H04M 3/5183
See application file for complete search history.

(56) References Cited

U.S. PATENT DOCUMENTS

| | | | |
|---|---|---|---|
| 6,801,899 B2 * | 10/2004 | Lauffer | G06Q 10/0631 |
| | | | 705/7.13 |
| 7,127,264 B2 | 10/2006 | Hronek et al. | |
| 8,200,262 B2 * | 6/2012 | McGary | H04M 15/00 |
| | | | 455/466 |
| 8,428,548 B2 | 4/2013 | Ray et al. | |
| 9,560,199 B2 | 1/2017 | Mezhibovsky et al. | |
| 2004/0015380 A1 * | 1/2004 | Timmins | H04M 3/533 |
| | | | 705/346 |

(Continued)

FOREIGN PATENT DOCUMENTS

WO    WO 2011/106139    9/2011

OTHER PUBLICATIONS

"Zappix Announces Customer Services Visual IVR Solution for the Hearing Impaired," Vocus PRW Holdings, LLC, Jun. 29, 2020, 3 pages [retrieved online from: https://www.prweb.com/releases/2017/08/prweb14608391.htm].

(Continued)

*Primary Examiner* — Ahmad F. Matar
*Assistant Examiner* — Jirapon Intavong
(74) *Attorney, Agent, or Firm* — Sheridan Ross P.C.

(57) ABSTRACT

A first text message is received from a first user communication endpoint. In one embodiment, the first text message is addressed to a general text messaging address for a corporation. In response to receiving the first text message from the first user communication endpoint, a second text message is sent to the first user communication endpoint. The second text message is used to identify a way to select an individual user of the plurality users. For example, the second text message may have a menu with a list of users. A third text message is received from the first user communication endpoint. The third text message identifies the individual user of the plurality of users. A fourth text message is sent that allows the first user communication endpoint and a user communication endpoint of the selected individual user to establish a text messaging session.

20 Claims, 10 Drawing Sheets

(56) References Cited

U.S. PATENT DOCUMENTS

| | | | |
|---|---|---|---|
| 2004/0132433 A1* | 7/2004 | Stern | H04M 3/4931 |
| | | | 455/414.1 |
| 2005/0003837 A1 | 1/2005 | Midkiff et al. | |
| 2012/0263285 A1 | 10/2012 | Rajakumar et al. | |
| 2013/0173687 A1 | 7/2013 | Tuchman et al. | |
| 2014/0100902 A1* | 4/2014 | Godfrey | G06Q 30/06 |
| | | | 705/7.13 |
| 2015/0302415 A1* | 10/2015 | Reines | G06Q 10/1095 |
| | | | 705/7.19 |
| 2015/0310377 A1* | 10/2015 | Schlumberger | |
| | | | G06Q 10/063114 |
| | | | 705/7.15 |
| 2017/0359232 A1* | 12/2017 | Stoops | H04L 41/0686 |
| 2018/0013891 A1* | 1/2018 | Charlson | H04M 3/5232 |
| 2019/0075121 A1 | 3/2019 | Dutta | |

OTHER PUBLICATIONS

Official Action for U.S. Appl. No. 16/378,791, dated Jun. 15, 2020 13 pages.
Official Action for U.S. Appl. No. 16/378,791, dated Oct. 5, 2020 15 pages.
Notice of Allowance for U.S. Appl. No. 16/378,791, dated May 13, 2021 9 pages.

\* cited by examiner

INTERACTIVE SYSTEM FOR REROUTING A TWO-WAY TEXT COMMUNICATION PATHWAY

FIELD

The disclosure relates generally to text messaging systems and particularly to management of text messaging systems.

BACKGROUND

Voice telecommunication systems include automated attendants, the purpose of which is to allow a user to establish a two-way communication session with a specific person. Voice telecommunication systems also include an Interactive Voice Response (IVR) capability, the purpose of which is to take a user's input, process it, and return a result. For example, the menu presented by a bank's telephone-access IVR system allows a user to find out a branch's hours of operation, check personal account balances, confirm that a deposit has cleared, and transfer funds from one account to another. Note that in all operations supported by IVR systems, the user's interactions are with a computer and not with another person. Although IVR-like functionality exists in text messaging systems (including an ability to send a text message to a specific address), text messaging systems do not have an attendant function that would allow users to establish a direct two-way text communication link between themselves and a desired party.

SUMMARY

These and other needs are addressed by the various embodiments and configurations of the present disclosure. A first text message is received from a first user communication endpoint. In one embodiment, the first text message is addressed to a general text messaging address for a corporation. In response to receiving the first text message from the first user communication endpoint, a second text message is sent to the first user communication endpoint. The second text message is used to identify a way to select an individual user of the plurality users. For example, the second text message may have a menu with a list of users. A third text message is received from the first user communication endpoint. The third text message identifies the individual user of the plurality of users. A fourth text message is sent that allows the first user communication endpoint and a user communication endpoint of the selected individual user to establish a text messaging session.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

As described herein and in the claims a body of a text message/email is the text portion of the text message/email. The body does not refer to addresses/telephone numbers that are used to route the text message/email and may be displayed as part of the text message/email.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination,

DETAILED DESCRIPTION

Figure 1:
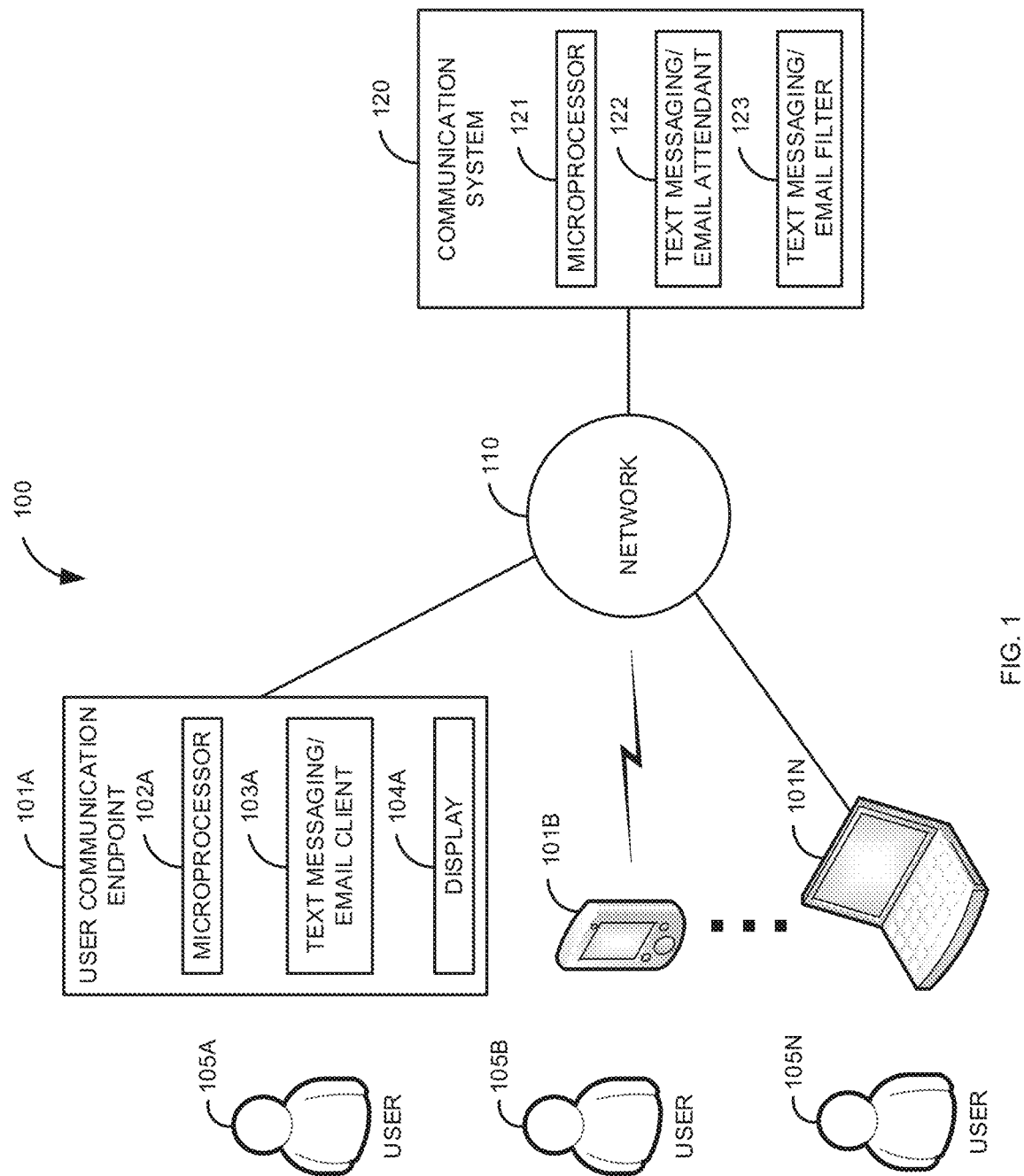
FIG. 1 is a block diagram of a first illustrative system for rerouting a text messaging/email pathway.

FIG. 1 is a block diagram of a first illustrative system 100 for rerouting a text messaging/email pathway. The first illustrative system 100 comprises user communication endpoints 101A-101N, a network 110, and a communication system 120. In addition, users 105A-105N are shown being associated with the user communication endpoints 101A-101N.

The user communication endpoints 101A-101N can be or may include any user communication endpoint device that can communicate on the network 110, such as a Personal Computer (PC), a telephone, a video system, a cellular telephone, a Personal Digital Assistant (PDA), a tablet device, a notebook device, a smartphone, and/or the like. The user communication endpoints 101A-101N are devices where a communication sessions ends. The user communication endpoints 101A-101N are not network elements that facilitate and/or relay information in the network, such as a communication manager or router. As shown in FIG. 1, any number of user communication endpoints 101A-101N may be connected to the network 110.

The user communication endpoint 101A further comprise a microprocessor 102A, a text messaging/email client 103A, and a display 104A. Although not shown for convenience, the user communication endpoints 101B-101N also comprise a microprocessor 102, a text messaging client 103, and a display.

The microprocessor 102A can be or may include any hardware processor, such as a micro-controller, an application specific processor, a multi-core processor, a digital signaling processor, and/or the like.

The text messaging/email client 103A can be or may include any client that can be used to send a text message (e.g., a Short Message Service (SMS)) and/or an email. The text messaging/email client 103A can send text messages and/or emails to the text messaging/email attendant 122.

The display 104A can be or may include any hardware display that can display information to the user 105A. For example, the display 104A may be a Light Emitting Diode (LED) display, a plasma display, a liquid crystal display, a cathode ray tube, a projector, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), email protocols, text messaging protocols (e.g., Short Message Service (SMS)), and/or the like. Thus, the network 110 is an electronic communication network configured to carry messages via packets and/or circuit switched communications.

The communication system 120 can be or may include any hardware coupled with software that can manage how text messages/emails are routed between the user communication endpoints 101A-101N. The communication system 120 further comprises a microprocessor 121, a text messaging/email attendant 122, and a text messaging/email filter 123.

The microprocessor 121 can be or may include any hardware processor, such as a micro-controller, an application specific processor, a multi-core processor, a digital signaling processor, and/or the like.

The text messaging/email attendant 122 can be or may include any software that can manage how text messages/emails are routed between the user communication endpoints 101A-101N. The text messaging/email attendant 122 may be used as a gateway that allows text messaging/email addresses to be hidden from other users 103.

The text messaging/email filter 123 can be or may include any software that can be used to filter text messages/emails. The text messaging/email filter 123 uses one or more rules (e.g., a blacklist/IP address) to filter text messages/emails.

Figure 2:
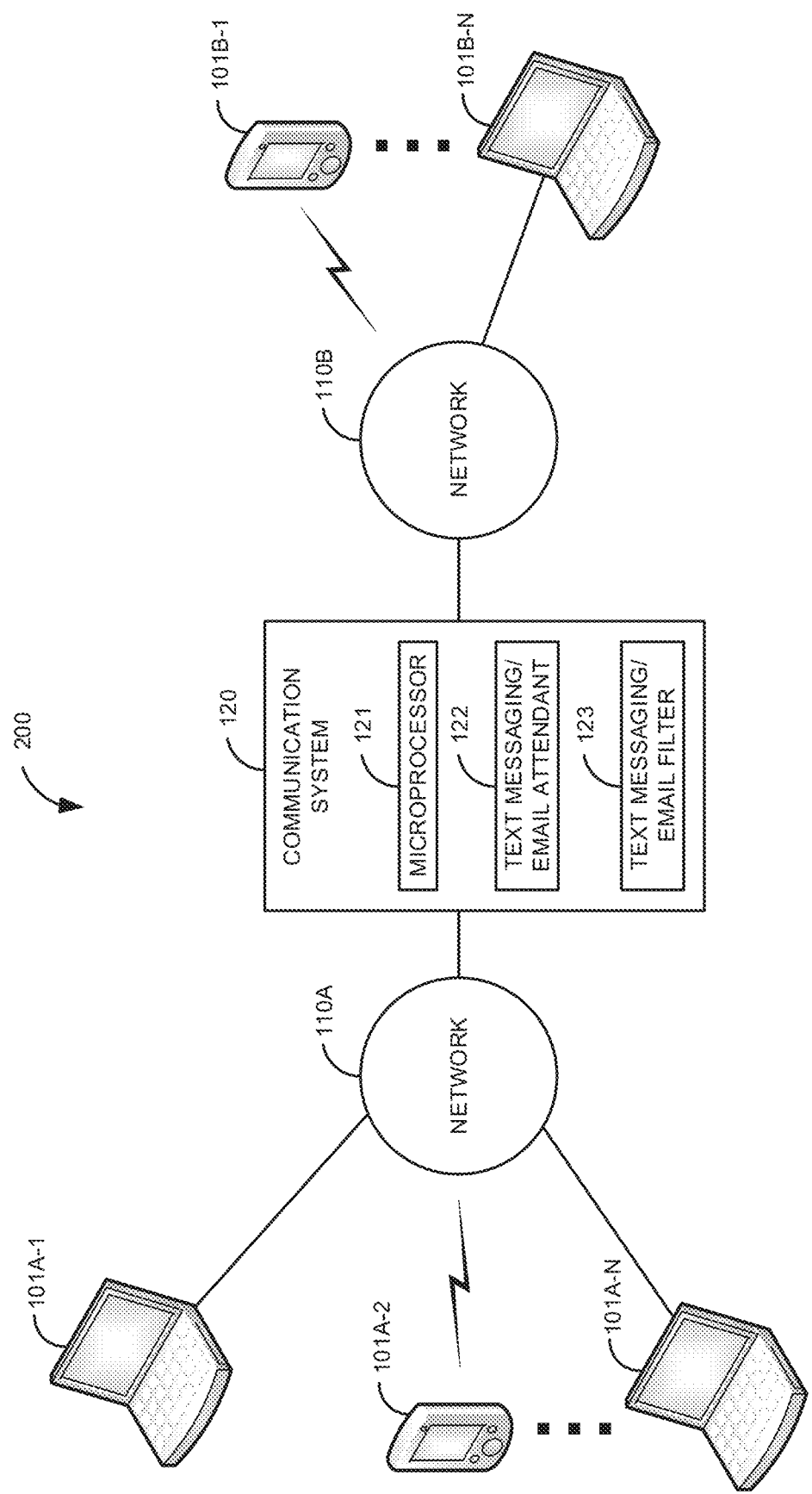
FIG. 2 is a block diagram of a second illustrative system for rerouting a text messaging/email pathway.

FIG. 2 is a block diagram of a second illustrative system 200 for rerouting a text messaging/email pathway. The second illustrative system comprise user communication endpoints 101A-1-101A-N, 101B-1-101B-N, networks 110A-110B and the communication system 120. In FIG. 2, the network 110A is typically a public network, such as the Internet. The network 110B is typically a private network, such as, a corporate network. In FIG. 2, the communication system 120 is typically used to send text messages/emails between the user communication endpoints 101A-1-101A-N and the user communication endpoints 101B-1-101B-N.

Figure 3:
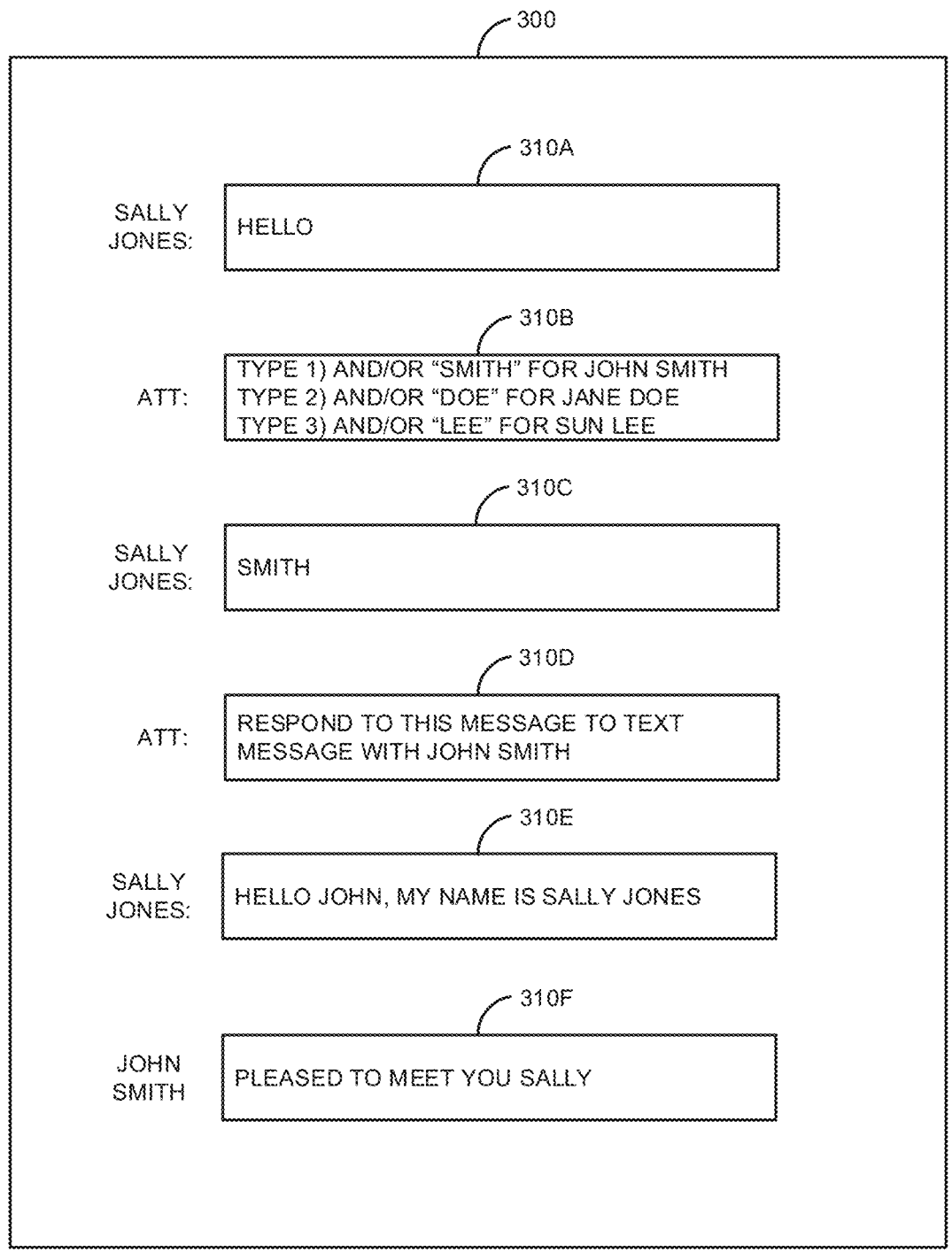
FIG. 3 is a diagram of a first user interface that depicts a series of text messages/emails for rerouting a text messaging/email pathway.

FIG. 3 is a diagram of a first user interface 300 that depicts a series of text messages/emails for rerouting a text messaging/email pathway. Illustratively, the user communication endpoints 101A-101N, 101A-1-101A-N, and 101B-1-101B-N, the text messaging/email client 103A, the communication system 120, the text messaging/email attendant 122, and the text messaging/email filter 123 are stored-program-controlled entities, such as a computer or microprocessor 102A/121, which performs the method of FIGS. 3-9 and the processes described herein by executing program instructions stored in a computer readable storage medium, such as a memory (i.e., a computer memory, a hard disk, and/or the like). Although the methods described in FIGS. 3-9 are shown in a specific order, one of skill in the art would recognize that the steps in FIGS. 3-9 may be implemented in different orders and/or be implemented in a multi-threaded environment. Moreover, various steps may be omitted or added based on implementation.

The user interface 300 is displayed in the display 104A to the user 105A. The user interface 300 depicts a series of text messages 310A-310F. However, as one of skill in the art would recognize, the text messages 310A-310F may also be a series of emails. The text messages 310A-310F of FIG. 3 are described in relation FIG. 1; however, as one of skill in the art would recognize, the text messages of FIG. 3 may also be implemented by the system of FIG. 2.

In FIG. 3, the user 105A is Sally Jones. The user 105A (Sally Jones) sends, using the text messaging/email client 103A, the text message 310A to the text messaging/email attendant 122. For example, the user 105A (Sally Jones) sends the text message 410A to a corporate text messaging/email attendant 122. In FIG. 3, the user 105A (Sally Jones) sent a text message 310A that states "HELLO." The content of the text message 310A may be any text or may even not have text. In response, the text messaging/email attendant 122 sends the text message 310B to the text messaging/email client 103A. The text message 310B has a list of three options of how to contact the users 105 "JOHN SMITH," JANE DOE," and "SUN LEE." To contact the user "JOHN SMITH," the user 105A (Sally Jones) can type "1" and/or the name "SMITH." To contact the user "JANE DOE," the user 105A (Sally Jones) can type "2" and/or the name "DOE." To contact the user "SUN LEE," the user 105A (Sally Jones) can type "3" and/or "LEE."

In response to the text message 310AB, the user 105A (Sally Jones) types the name "SMITH" in the text message 310C and then sends the text message 310A to the text messaging/email attendant 122. The text messaging/email attendant 122 responds by sending the text message 310D to the text messaging/email client 103A. The text message 310D tells the user 105A (Sally Jones) that by just responding to the message 310D, a text message will be sent to the user JOHN SMITH. To accomplish sending a response to JOHN SMITH, the text messaging/email attendant 122 may respond with the message 310D by using the address (e.g., telephone number/text messaging address) to contact JOHN SMITH directly. In other words, the text messaging/email attendant 122 terminates the two-way communication session between Sally Jones and the text messaging/email attendant 122 and a two-way text messaging session is established directly between Sally Jones and JOHN SMITH. For example, the two-way text messaging session between the text messaging/email attendant 122 and Sally Jones may be automatically terminated after an inactivity timer expires. Alternatively, the two-text messaging session between the text messaging/email attendant 122 and Sally Jones may be terminated based on a terminate session message sent by either of the users 105 Sally Jones or JOHN SMITH (via the text messaging/email client 103). When the two-way text messaging session between the text messaging/email attendant 122 and Sally Jones is terminated, the message of step 310B will be displayed in response to a text message sent from Sally Jones.

Alternatively, the text message 310D may include a telephone number or text messaging address that the user 105A (Sally Jones) can use to establish the text messaging session with JOHN SMITH. In one embodiment, the text message 310D may use the address of the text messaging/email attendant 122 along with the users name JOHN SMITH. This way text messaging/email attendant 122 may hide the text messaging address of the user JOHN SMITH, but still allow the text messaging session to take place.

The user 105A (Sally Jones) sends the text message 310E to JOHN SMITH. JOHN SMITH responds by sending the text message 310F. Thus a text messaging session is established between the user 105A (Sally Jones) and the user 105 JOHN SMITH (e.g., at user communication endpoint 101B).

For example, the text messaging attendant/email attendant 122 may be used by a doctor's office where the user 105A (Sally Jones) is a patient. The users 105 JOHN SMITH, JANE DOE, and SUN LEE are different doctors in the doctors office. In this example, the text message 310B would say to contact "DR. JOHN SMITH," the user 105A (Sally Jones) can type "1" and/or the name "SMITH." To contact "DR. JANE DOE," the user 105A (Sally Jones) can type "2" and/or the name "DOE." To contact "DR. SUN LEE," the user 105A (Sally Jones) can type "3" and/or "LEE."

Figure 4:
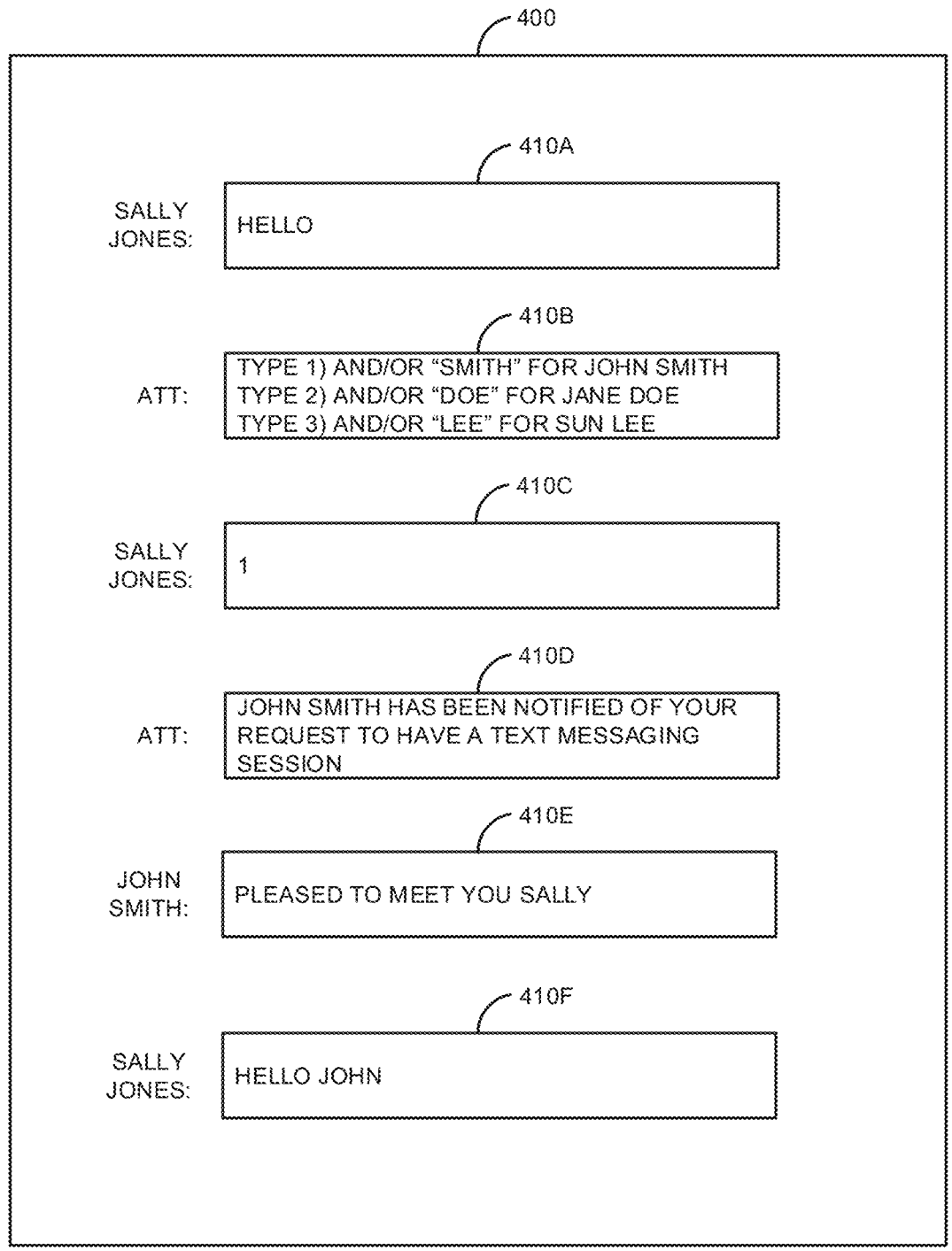
FIG. 4 is a diagram of a second user interface that depicts a series of text messages/emails for rerouting a text messaging/email pathway.

FIG. 4 is a diagram of a second user interface 400 that depicts a series of text messages/emails for rerouting a text messaging/email pathway. The user interface 400 is displayed in the display 104A to the user 105A. The user interface 400 depicts a series of text messages 410A-410F. However, as one of skill in the art would recognize, the text messages 410A-410F may also be a series of emails. The text messages 410A-410F of FIG. 4 are described in relation FIG. 1; however, as one of skill in the art would recognize, the text messages of FIG. 4 may also be implemented by the system of FIG. 2.

In FIG. 4, the user 105A is Sally Jones. The user 105A (Sally Jones) sends, using the text messaging/email client 103A, a text message 410A to the text messaging/email attendant 122. For example, the user 105A (Sally Jones) sends the text message 410A to a cloud-based text messaging/email attendant 122. In FIG. 4, the user 105A (Sally Jones) sent a text message that states "HELLO." The content of the text message 410A may be any text or may even not have text. In response, the text messaging/email attendant 122 sends the text message 410B to the text messaging/email client 103A. The text message 410B has a list of three options of how to contact the users 105 "JOHN SMITH," JANE DOE," and "SUN LEE." To contact the user "JOHN SMITH," the user 105A (Sally Jones) can type "1" and/or the name "SMITH." To contact the user "JANE DOE," the user 105A (Sally Jones) can type "2" and/or the name "DOE." To contact the user "SUN LEE," the user Sally Jones can type "3" and/or "LEE."

The user 105A (Sally Jones) types the number "1" in the text message 410C and sends the text message 401C to the text messaging/email attendant 122. The text messaging/email attendant 122 responds by sending the text message 410D. The text message 410D states that the user JOHN SMITH and been notified of the request to have a text messaging session. The text messaging session between the text messaging/email attendant 122 and the user 105A (Sally Jones) is automatically terminated (or may be terminated based on inactivity/terminate message). When the two-way text messaging session between the text messaging/email attendant 122 and Sally Jones is terminated, the message of step 410B will be displayed in response to a text message sent from Sally Jones.

For example, after terminating the text messaging session, the user JOHN SMITH receives a text message that indicates that the user 105A (Sally Jones) wants to have a text message session. The user JOHN SMITH responds and sends the text message 410E to the text messaging/email client 103A, which is then displayed in the user interface 400. The user 105A (Sally Jones) responds to the text message 410E by sending the text message 410F. In addition to Sally Jones' name, the text message sent to JOHN SMITH may include additional information, such as, record number(s) of previous conversation(s), transcript(s) of previous communication(s), and/or information about Sally Jones obtained from a database look-ups (e.g., "Sally Jones is deaf and cannot communicate by voice").

The process of FIG. 4 may also work where the address in the text message 410E has the address of the text messaging/email attendant 122. This way, the text messaging address of JOHN SMITH is not revealed to the user 105A (Sally Jones).

Figure 5:
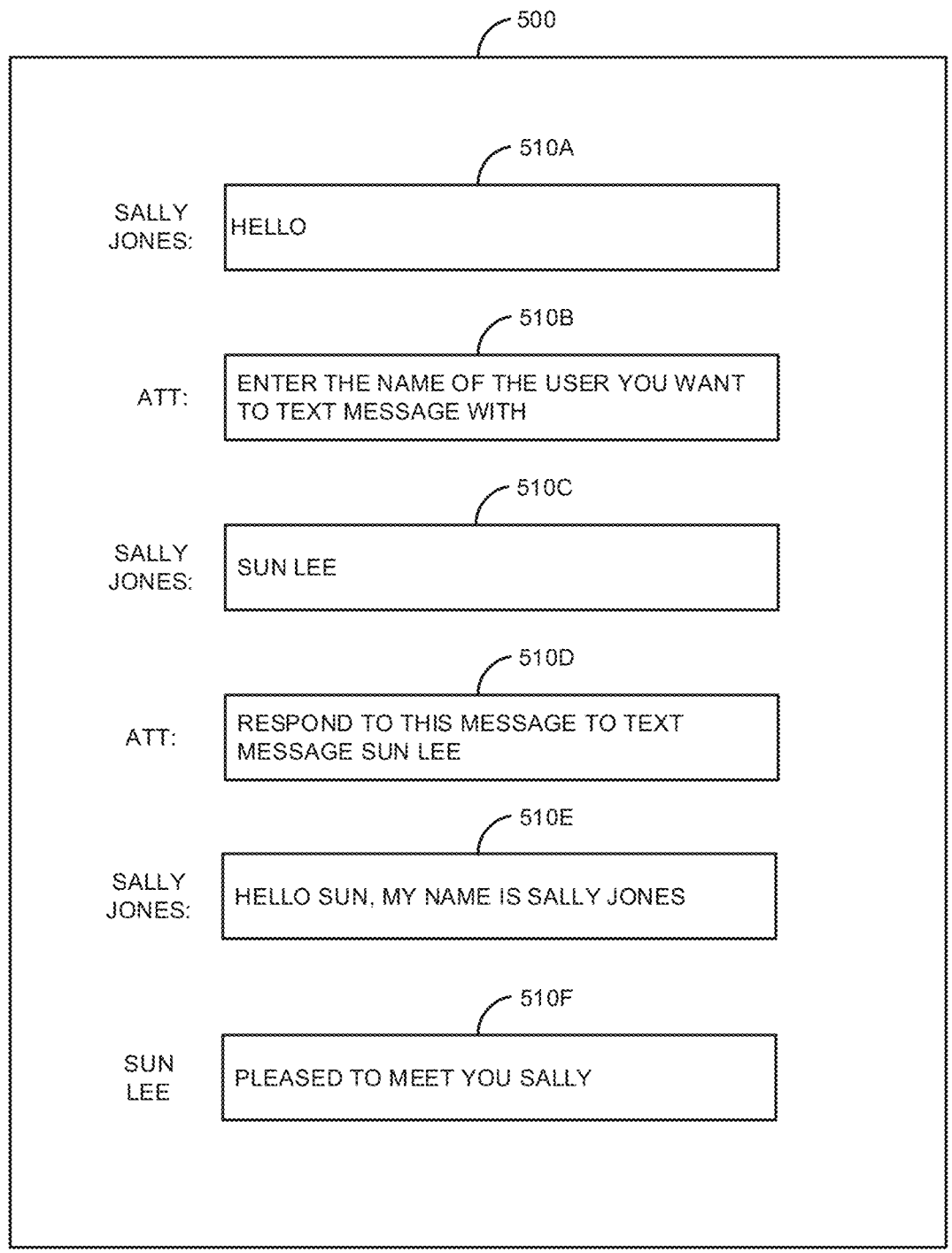
FIG. 5 is a diagram of a third user interface that depicts a series of text messages/emails for rerouting a text messaging/email pathway.

FIG. 5 is a diagram of a third user interface 500 that depicts a series of text messages/emails for rerouting a text messaging/email pathway. The user interface 500 is displayed in the display 104A to the user 105A. The user interface 500 depicts a series of text messages 510A-510F. However, as one of skill in the art would recognize, the text messages 510A-510F may also be a series of emails. The text messages of FIG. 5 are described in relation FIG. 1; however, as one of skill in the art would recognize, the text messages of FIG. 5 may also be implemented by the system of FIG. 2.

In FIG. 5, the user 105A is Sally Jones. The user 105A (Sally Jones) sends, using the text messaging/email client 103A, a text message 510A to the text messaging/email attendant 122. For example, the user 105A (Sally Jones) sends the text message 510A to a corporate text messaging/email attendant 122. In FIG. 5, the user 105A (Sally Jones) sent a text message that states "HELLO." The content of the text message 510A may be any text or may even not have text.

The text messaging/email attendant 122 responds to the text message 510A by sending the text message 510B. The text message 510B states that the user 105A (Sally Jones) may respond by entering the name of the user 105 that the user 105A (Sally Jones) wants to establish a text messaging session with. In response, the user 105A (Sally Jones) sends the text message 510C that has the name "SUN LEE" to the text messaging/email attendant 122. The text messaging/email attendant 122 responds by sending the text message 510D to the text messaging/email client 103A, which is displayed to the user 105A (Sally Jones). In other words, the text messaging/email attendant 122 terminates the two-way communication session between Sally Jones and the text messaging/email attendant 122 and a two-way text messaging session is established directly between Sally Jones and SUN LEE. For example, the two-way text messaging session between the text messaging/email attendant 122 and Sally Jones may be automatically terminated after an inactivity timer expires. When the two-way text messaging session between the text messaging/email attendant 122 and Sally Jones is terminated, the message of step 510B will be displayed in response to a text message sent from Sally Jones. Alternatively, the two-way text messaging session between the text messaging/email attendant 122 and Sally Jones may be terminated based on a terminate session message sent by either of the users 105 Sally Jones or SUN LEE (via the text messaging/email client 103). When the two-way text messaging session between the text messaging/email attendant 122 and Sally Jones is terminated, the message of step 510B will be displayed in response to a text message sent from Sally Jones.

Alternatively, the text message 510D may include a telephone number or text messaging address that the user 105A (Sally Jones) can use to establish the text messaging/email session with SUN LEE. In one embodiment, the text message 510D may use the address of the text messaging/email attendant 122. This way text messaging/email attendant 122 may hide the text messaging address of the user JOHN SMITH, but still allow the text messaging session to take place.

The user 105A (Sally Jones) responds to the text message 510D by sending the text message 510E. The text message 510E goes to the user SUN LEE. The user 105 SUN LEE responds by sending the text message 510F to the text messaging/email client 103A. This results in the text messaging session being established between the user 105A and the user 105 SUN LEE.

In FIG. 5, the text messages 510A and 510B may not be necessary. For example, the user 105A (Sally Jones) may just start by sending the text message 610C that has the name "SUN LEE."

Figure 6:
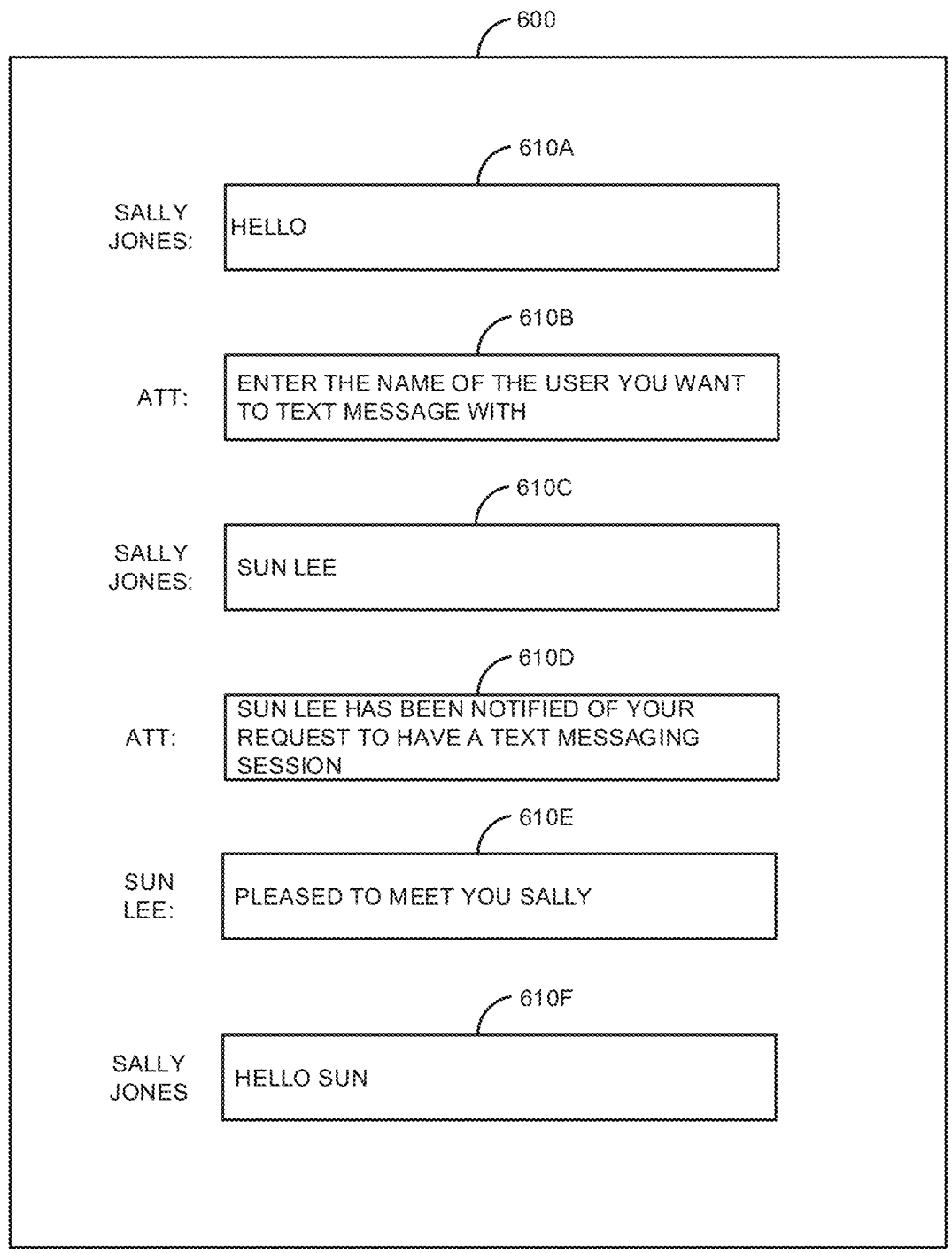
FIG. 6 is a diagram of a fourth user interface that depicts a series of text messages/emails for rerouting a text messaging/email pathway.

FIG. 6 is a diagram of a fourth user interface 600 that depicts a series of text messages/emails for rerouting a text messaging/email pathway. The user interface 600 is displayed in the display 104A to the user 105A. The user interface 600 depicts a series of text messages 610A-610F. However, as one of skill in the art would recognize, the text messages 610A-610F may also be a series of emails. The text messages of FIG. 6 are described in relation FIG. 1; however, as one of skill in the art would recognize, the text messages of FIG. 6 may also be implemented by the system of FIG. 2.

In FIG. 6, the user 105A is Sally Jones. The user 105A (Sally Jones) sends, using the text messaging/email client 103A, the text message 610A to the text messaging/email attendant 122. For example, the user 105A (Sally Jones) sends the text message 610A to a cloud-based text messaging/email attendant 122. In FIG. 6, the user 105A (Sally Jones) sent a text message 610A that states "HELLO." The content of the text message 610A may be any text or may even not have text.

The text messaging/email attendant 122 responds to the text message 610A by sending the text message 610B. The text message 610B states that the user 105A (Sally Jones) may respond by entering the name of the user 105 that the user 105A (Sally Jones) wants to establish a text messaging session with. In response, the user 105A (Sally Jones) sends the text message 610C that has the name "SUN LEE" to the text messaging/email attendant 122. The text messaging/email attendant 122 responds by sending the text message 610D to the text messaging/email client 103A, which is displayed to the user 105A (Sally Jones). The text messaging session between the text messaging/email attendant 122 and the user 105A (Sally Jones) is automatically terminated (or may be terminated based on inactivity/terminate message). When the two-text messaging session between the text messaging/email attendant 122 and Sally Jones is terminated, the message of step 610B will be displayed in response to a text message sent from Sally Jones. The text message 610D indicates that the user SUN LEE has been notified of the user 105A's request to have a text messaging session.

The user SUN LEE (e.g., at user communication endpoint 101B) responds by sending the text message 610E to the user 105A (Sally Jones). The user 105A (Sally Jones) responds to the text message 610E by sending the text message 610F to the user SUN LEE. Thus a text messaging session is established between the users Sally Jones and SUN LEE.

The process of FIG. 6 may also work where the address in the text message 410E has the address of the text messaging/email attendant 122. This way, the text messaging address of SUN LEE is not revealed to the user 105A (Sally Jones). The benefit of this solution is that it provides privacy for the users 105. For example, because all communication passes through the text messaging attendant 122, the text messaging attendant 122 can ensure that the originating user 105 never sees the recipient's address. The text messaging attendant 122 may also ensure that the recipient user 105 never sees the originator's address.

In FIG. 6, the text messages 610A and 610B may not be necessary. For example, the user 105A (Sally Jones) may just start by sending the text message 610C that has the name "SUN LEE."

Figure 7:
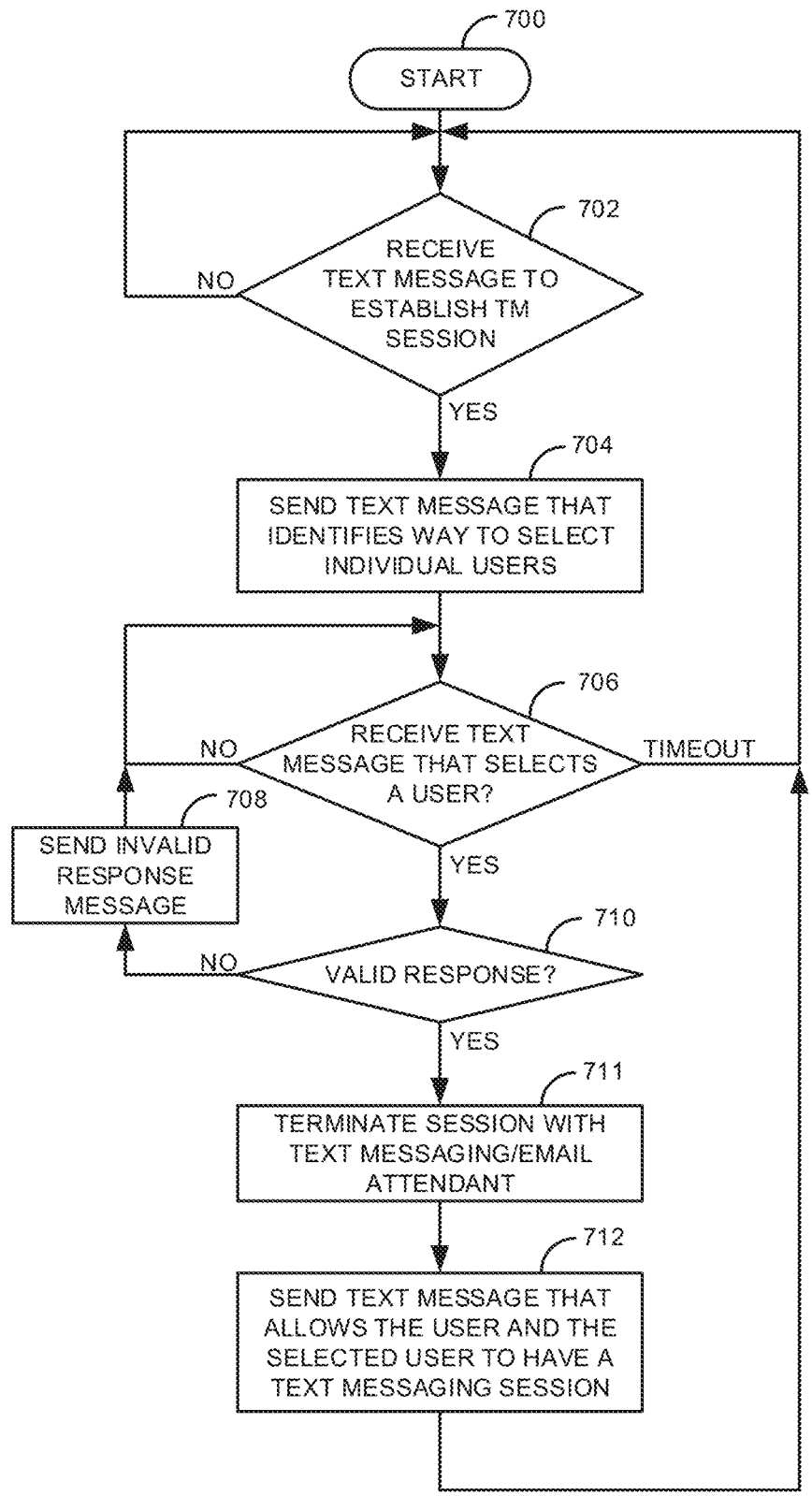
FIG. 7 is a flow diagram of a first process for rerouting a text messaging/email pathway.

FIG. 7 is a flow diagram of a first process for rerouting a text messaging/email pathway. The process starts in step 700. The text messaging/email attendant 122 waits, in step 702, to receive a test message to establish a text messaging session. If a text message is not received in step 702, the process of step 702 repeats.

Otherwise, if a text message is received in step 702, the text messaging/email attendant 122 sends, in step 704, a text message that identifies a way to select individual users 105. For example, the text messaging/email attendant 122 sends one of the text messages 310B, 410B, 510B, or 610B. The text messaging/email attendant 122 waits, in step 706 to receive a text message (e.g., one of text messages 310C, 410C, 510C, or 610C) that selects a user 105. If a text message is not received in step 706, the process of step 706 repeats unless there is a timeout. If there is a timeout (e.g., no text message received within a certain time) the process goes to step 700.

Otherwise, if a text message is received in step 706, the text messaging/email attendant 122 determines if the text message is valid (e.g., identified a specific user). If the text message is not valid in step 710, the text messaging/email attendant 122 sends, in step 708, a text message that states that the text message received in step 706 was invalid. If the text message is valid in step 710, the text messaging/email attendant 122 terminates the text messaging session between the text messaging/email attendant 122/Sally Jones in step 711. The text messaging/email attendant 122 sends, in step 712, the text message (e.g., one of text message 310D, 510D, or the messages sent to the selected user 105) that allows the user (e.g., 105A) and the selected user (e.g., 105B) to have a text messaging session. The process then goes to step 702.

Figure 8:
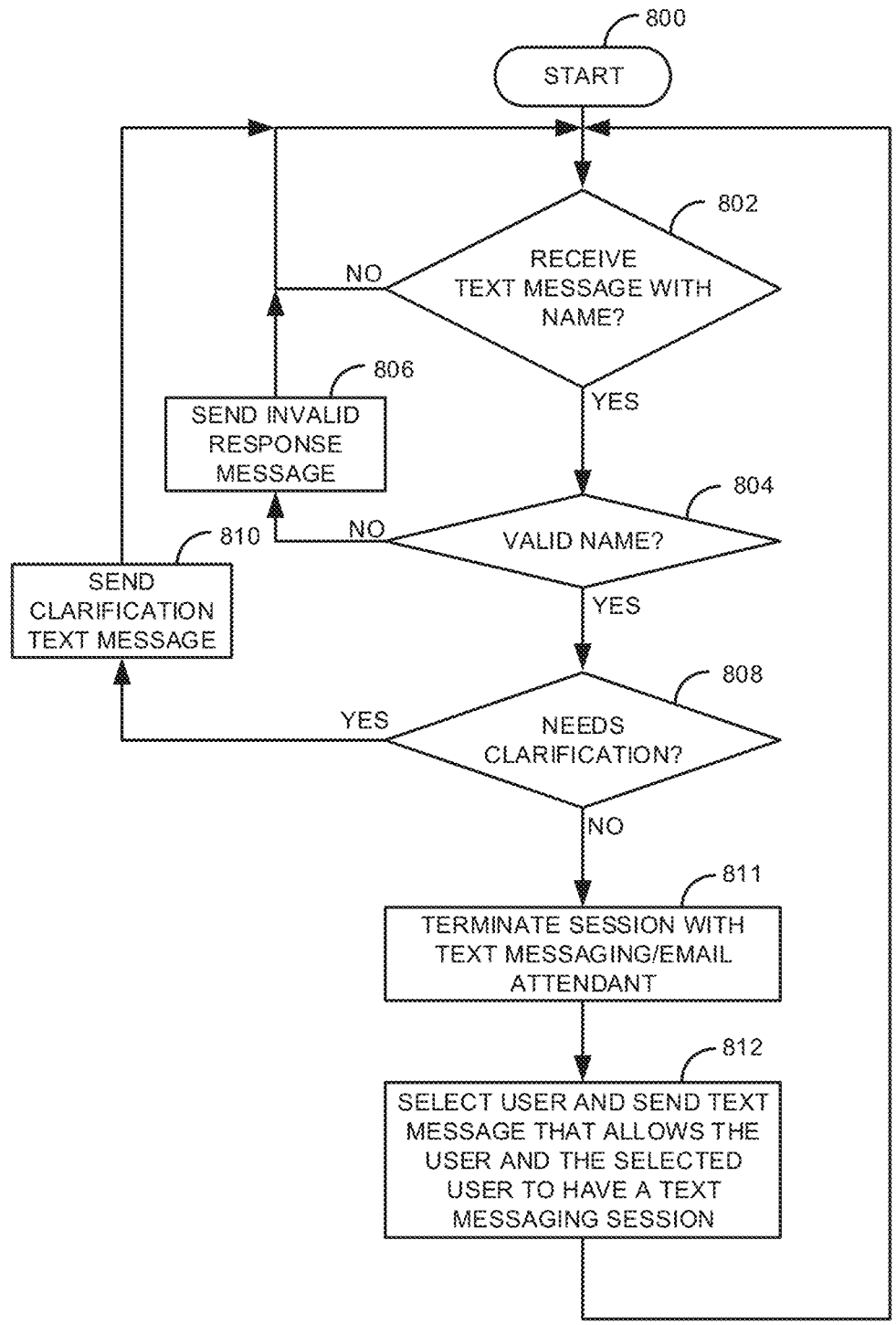
FIG. 8 is a flow diagram of a second process for rerouting a text messaging/email pathway.

FIG. 8 is a flow diagram of a second process for rerouting a text messaging/email pathway. The text messaging/email attendant 122 waits, in step 802, to receive a text message with a name. For example, the text message 510C or 610C are text messages with a name. If a text message is not received in step 802, the process of step 802 repeats. Otherwise, if a text message with a name is received in step 802, the text messaging/email attendant 122 determines, in step 804, if the name is valid. This may be done by searching through a list of names in a database. For example, the text messaging/email attendant 122 can determine if the user correctly typed the name "SUN LEE." If the name is invalid in step 804, the text messaging/email attendant 122 sends, in step 806, a text message that indicates the name is invalid.

Otherwise, if the name is valid in step 808, the text messaging/email attendant 122 determines, in step 808, if the name needs clarification. For example, if the user entered the name "SMITH" and there are two users named WILMA SMITH and JOHN SMITH. If clarification is needed in step 808, a clarification text message is sent in step 810 and the process goes to step 802. If clarification is not needed in step 808, the text messaging/email attendant 122 terminates the text messaging session between the text messaging/email attendant 122/Sally Jones in step 811. The text messaging/email attendant 122 selects, in step 812, the user 105 and sends a text message that allows the user 105 and the selected user 105 to have a text messaging session (e.g., the text message 510D or the text message sent to SUN LEE as described in FIG. 6). The process then goes to step 802.

In one embodiment, (that will work for any of the process described in FIGS. 3-8) when the text messaging/email attendant 122 remains as an intermediary element, after the text messaging session is established between the user 105A (Sally Jones) and the other user 105 (via the text messaging/email attendant 122) either one of the user communication endpoints 101 involved, may send a text message to terminate the text messaging session (e.g., by clicking on a terminate button). This text message then causes the text messaging/email attendant 122 to terminate the text messaging session. In addition, this message causes the text messaging/email attendant 122 to send the initial menu message (e.g., message 310B, 410B, 510B, or 610B) when a text message is received from Sally Jones.

Figure 9:
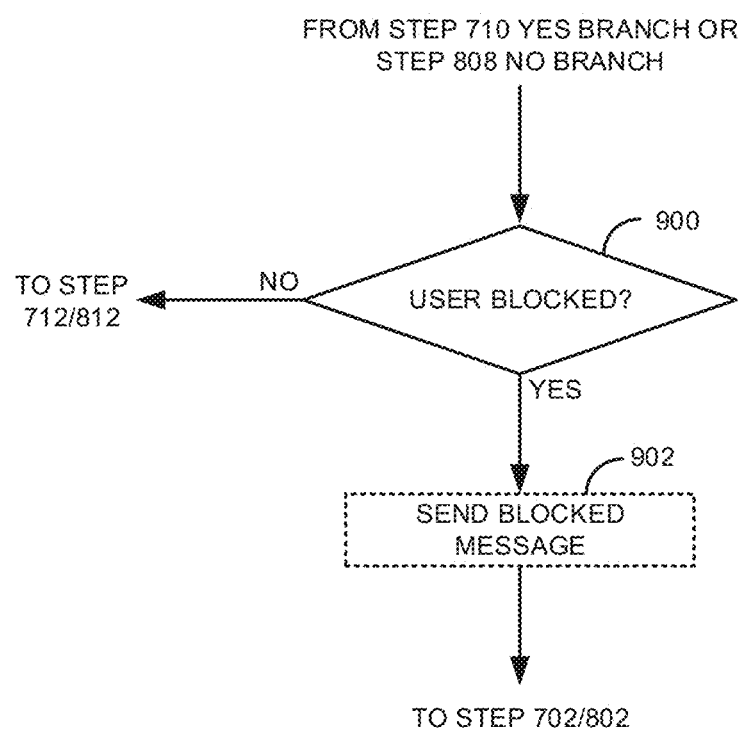
FIG. 9 is a flow diagram of a process for blocking unwanted text messages/emails.

FIG. 9 is a flow diagram of a process for blocking unwanted text messages/emails. The process of FIG. 9 goes between steps 710/711 and 808/811. After determining that the response is valid in step 710 or that clarification is not needed in step 808, the text messaging/email attendant 122 determines, in step 900, whether the user 105A has been blocked (e.g., blacklisted). If the user has not been blocked in step 900, the process goes to step 712/812. Otherwise, if the user is blocked in step 900, the text messaging/email attendant 122 can optionally send a blocked message to the user 105A in step 902. The process then goes to step 702/802.

The process of FIG. 9 may be used as a type of SPAM filter for text messaging and/or email. For example, specific telephone numbers (e.g., originating from a specific country)/emails addresses (e.g., from a specific company may be identified. Alternatively, the text messages (e.g., 310B, 410B, 510B, and 610B) may be used in the filtering process. For example, the text message of step 310B may only contain one option or have one or more options that are not legitimate.

Figure 10:
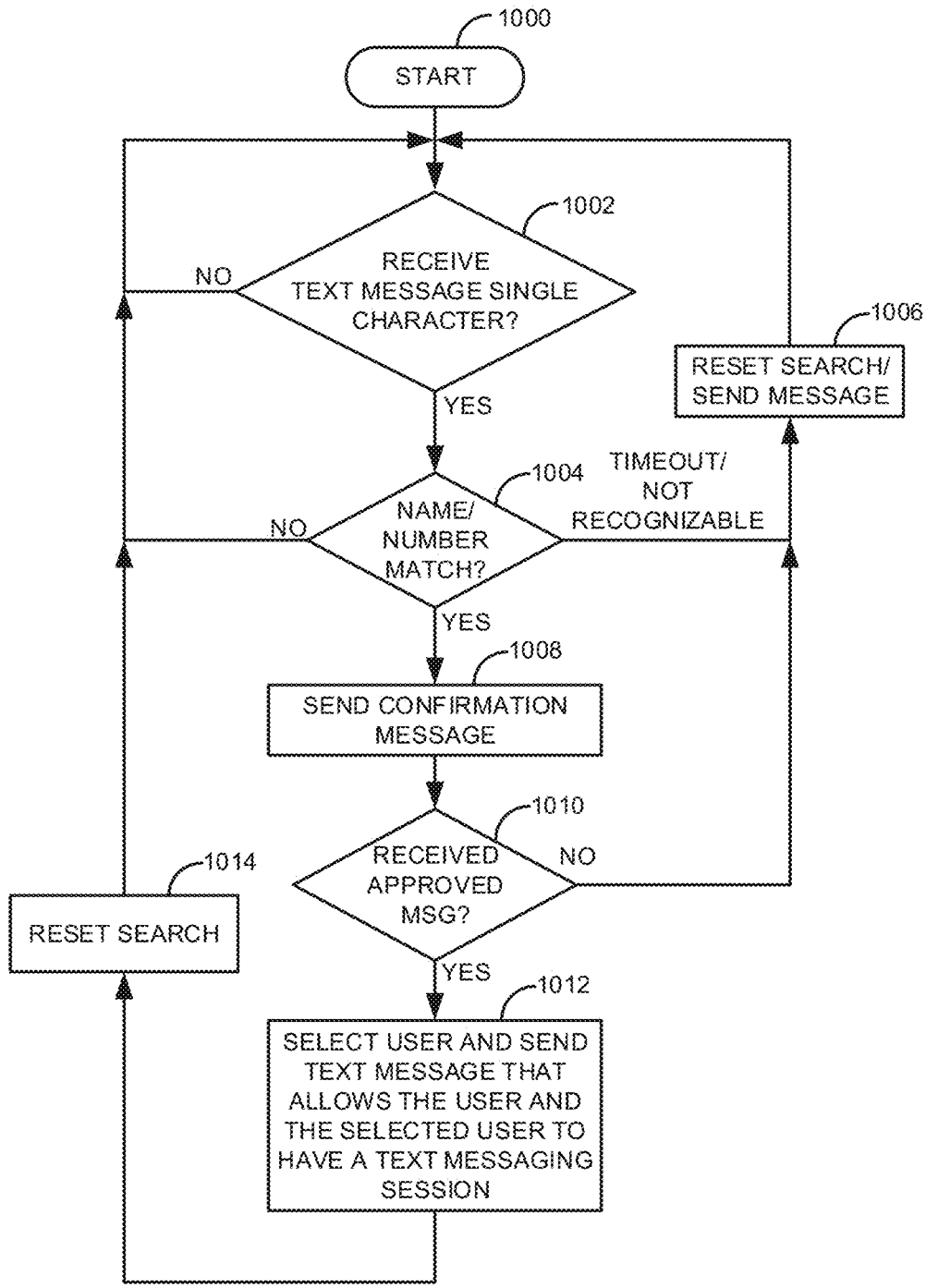
FIG. 10 is a flow diagram of a process for rerouting a text messaging pathway based on receiving each character in a separate text message.

FIG. 10 is a flow diagram of a process for rerouting a text messaging pathway based on receiving each character in a separate text message. This type of process is used to replace an analog "Baudot" Teletype based on EIA TIA-825A protocols that are used by people with hearing loss. For example, the text message 310C (where the name "SMITH" is sent), this message would be sent as five separate text messages.

The process starts in step 1000. The text messaging/email attendant 122 determines if a text message with a single character is received. For example, as the user 105A types out the name "SMITH," the text messaging/email attendant 122 would process the receipt of each character individually. If a text message is not received in step 1002, the process of step 1002 repeats.

If a character is received in step 1002, the text messaging/email attendant 122 determines, in step 1004, if there is a name (e.g., as shown in text message 310C) and/or number (e.g., as shown in text message 410C) match. For example, after receiving the characters in five separate text messages that match the user "SMITH." If there is no match in step 1004, the process goes back to step 1002. If there is a timeout (e.g., the user has stopped typing for a predetermined period of time) or there is clearly not a match (e.g., the typed string cannot match any user 105) the process goes to step 1006. In step 1006, the search process is reset (e.g., the text messaging/email attendant 122 starts building a new search string) and a text message is sent to indicate what happened (e.g., timeout/unrecognizable string). The process then goes to step 1002.

If there is a match in step 1004, the text messaging/email attendant 122 sends a confirmation text message in step 1008. For example, to ask the user 105A if the selected user is correct (e.g., by responding with a Y or N). If an approval text message is received in step 1010, the user 105 is selected and a text message is sent that allows the user 105A to have a text messaging session with the selected user is sent in step 1012. The search process is reset, in step 1014, which starts a new search. Otherwise, if an approval message is not received (or has an invalid response) the process goes to step 1006 to reset the search and send a text message to indicate that the user 105A must start over. The process then goes to step 1002.

In FIG. 10, the steps 1008 and 1010 may be optional. For example, if there is a match in step 1004, the process may go directly to step 1012.

The process described in FIGS. 1-10 are described where the same type of messages are used throughout. For example, where all the messages are text messages or all the messages are emails. In one embodiment, the text messaging/email attendant 122 may act as a translator between message formats. For example, the user 105A may be communicating via text messaging and the other user (e.g., 105B) may be communicating using email. The user 105 may use an administration application to identify a preferred messaging modality. For example, the user 105B may set a preference that he/she wants to communicate via email regardless of what communication modality the user 105A communicates with.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An automated text messaging attendant comprising:
a microprocessor; and
a computer readable medium, coupled with the microprocessor and comprising microprocessor readable and executable instructions that, when executed by the microprocessor, cause the microprocessor to:
receive a first text message directed to a general text messaging address from a first user communication endpoint of a first user;
in response to receiving the first text message from the first user communication endpoint, send a second text message to the first user communication endpoint, wherein the second text message identifies a way to select individual ones of a plurality of users, and wherein the second text message is sent from the general text messaging address;
receive a third text message from the first user communication endpoint, wherein the third text message identifies a selected one of the plurality of users; and
send a fourth text message, wherein the fourth text message allows the first user communication endpoint and a user communication endpoint of the selected one of the plurality of users to establish a text messaging session, and wherein the fourth text message is sent from a text messaging address associated with the selected one of the plurality of users.

2. The automated text messaging attendant of claim 1, wherein the fourth text message is sent to the first user communication endpoint, and wherein the fourth text message is tagged with a name of the selected one of the plurality of users.

3. The automated text messaging attendant of claim 1, wherein the fourth text message is sent to the user communication endpoint of the selected one of the plurality of users, and wherein responding to the fourth text message causes the text messaging session to be established.

4. The automated text messaging attendant of claim 1, wherein the fourth text message is sent to the user communication endpoint of the selected one of the plurality of users, and wherein the fourth text message includes additional information about a user associated with the first user communication endpoint.

5. The automated text messaging attendant of claim 1, wherein the fourth text message is sent to the user communication endpoint of the selected one of the plurality of users, and wherein the microprocessor readable and executable instructions further cause the microprocessor to:
send a fifth text message to the first user communication endpoint, wherein the fifth text message indicates that the selected one of the plurality of users has been notified of a request to establish the text messaging session.

6. The automated text messaging attendant of claim 1, wherein the fourth text message is sent to the first user communication endpoint, wherein the fourth text message includes a telephone number for the selected one of the plurality of users, and wherein the first user can establish the text messaging session with the selected one of the plurality of users by sending a text message to the telephone number.

7. The automated text messaging attendant of claim 1, wherein the third text message comprises a name or number that is used to select the selected one of the plurality of users.

8. The automated text messaging attendant of claim 1, wherein the microprocessor readable and executable instructions further cause the microprocessor to:
determine that a first user of the first user communication endpoint has been blocked; and
in response to determining that the first user of the first user communication endpoint has been blocked, not sending the fourth text message.

9. The automated text messaging attendant of claim 1, wherein each message is sent on a character-by-character basis, and wherein the microprocessor readable and executable instructions further cause the microprocessor to:
search, when receiving the third text message from the first user communication endpoint, on each character to see if there is a match that identifies the selected one of the plurality of users.

10. The automated text messaging attendant of claim 9, wherein the microprocessor readable and executable instructions further cause the microprocessor to:
send a fifth text message in response to receiving the third text message, wherein the fifth text message is a confirmation of the third text message; and
receive a sixth text message, wherein the sixth text message confirms or rejects the fifth text message.

11. A method comprising:
receiving, by a microprocessor, a first text message directed to a general text messaging address from a first user communication endpoint of a first user;
in response to receiving the first text message from the first user communication endpoint, sending, by the microprocessor, a second text message to the first user communication endpoint, wherein the second text message identifies a way to select individual ones of a plurality of users, and wherein the second text message is sent from the general text messaging address;
receiving, by the microprocessor, a third text message from the first user communication endpoint, wherein the third text message identifies a selected one of the plurality of users; and
sending, by the microprocessor, a fourth text message, wherein the fourth text message allows the first user communication endpoint and a user communication endpoint of the selected one of the plurality of users to establish a text messaging session, and wherein the fourth text message is sent from a text messaging address associated with the selected one of the plurality of users.

12. The method of claim 11, wherein the fourth text message is sent to the first user communication endpoint, and wherein responding to the fourth text message causes the text messaging session to be established.

13. The method of claim 11, wherein the fourth text message is sent to the user communication endpoint of the selected one of the plurality of users, and wherein the fourth text message includes additional information about a user associated with the first user communication endpoint.

14. The method of claim 11, wherein the fourth text message is sent to the first user communication endpoint, and wherein the fourth text message is tagged with a name of the selected one of the plurality of users.

15. The method of claim 11, wherein the fourth text message is sent to the user communication endpoint of the selected one of the plurality of users and further comprising:
sending a fifth text message to the first user communication endpoint, wherein the fifth text message indicates that the selected one of the plurality of users has been notified of a request to establish the text messaging session.

16. The method of claim 11, wherein the fourth text message is sent to the first user communication endpoint, wherein the fourth text message includes a telephone number for the selected one of the plurality of users, and wherein the first user can establish the text messaging session with the selected one of the plurality of users by sending a text message to the telephone number.

17. The method of claim 11, further comprising:
determining that a first user of the first user communication endpoint has been blocked; and
in response to determining that the first user of the first user communication endpoint has been blocked, not sending the fourth text message.

18. The method of claim 11, wherein each message is sent on a character-by-character basis and further comprising:
searching, when receiving the third text message from the first user communication endpoint, on each character to see if there is a match that identifies the selected one of the plurality of users.

19. The method of claim 18, further comprising:
sending a fifth text message in response to receiving the third text message, wherein the fifth text message is a confirmation of the third text message; and
receiving a sixth text message, wherein the sixth text message confirms or rejects the fifth text message.

20. An automated text messaging attendant comprising:
a microprocessor; and
a computer readable medium, coupled with the microprocessor and comprising microprocessor readable and executable instructions that, when executed by the microprocessor, cause the microprocessor to:
receive, a first text message directed to a general text messaging address from a first user, wherein a body of the first text message includes a name;
select a second user from a plurality of users based on the name in the body of the first text message; and
send a second text message wherein the second text message allows the first user and the second user to establish a text messaging session, and wherein the second text message is sent from a text messaging address associated with the second user.

* * * * *